(12) United States Patent
Carimalo et al.

(10) Patent No.: US 8,162,477 B2
(45) Date of Patent: Apr. 24, 2012

(54) PROGRESSIVE OPHTHALMIC LENS FOR MYOPIA CORRECTION AND METHOD FOR MAKING SUCH A LENS

(75) Inventors: Céline Carimalo, Charenton-le-Pont (FR); Björn Drobe, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 332 days.

(21) Appl. No.: 12/601,932

(22) PCT Filed: May 30, 2008

(86) PCT No.: PCT/FR2008/050958
§ 371 (c)(1),
(2), (4) Date: Nov. 25, 2009

(87) PCT Pub. No.: WO2008/149045
PCT Pub. Date: Dec. 11, 2008

(65) Prior Publication Data
US 2010/0208197 A1 Aug. 19, 2010

(30) Foreign Application Priority Data
May 31, 2007 (FR) .................................... 07 03884

(51) Int. Cl.
*G02C 7/06* (2006.01)
(52) U.S. Cl. ........................................ 351/169; 351/177
(58) Field of Classification Search .......... 351/168–172, 351/177
See application file for complete search history.

(56) References Cited

U.S. PATENT DOCUMENTS

| | | | |
|---|---|---|---|
| 3,628,854 A | 12/1971 | Jampolsky | |
| 5,123,725 A | 6/1992 | Winthrop | |
| 5,488,442 A * | 1/1996 | Harsigny et al. | 351/169 |
| 5,708,493 A * | 1/1998 | Ahsbahs et al. | 351/169 |
| 6,343,861 B1 | 2/2002 | Kris et al. | |
| 6,793,340 B1 * | 9/2004 | Morris et al. | 351/169 |
| 2005/0105047 A1 | 5/2005 | Smitth, III et al. | |

FOREIGN PATENT DOCUMENTS

| | | |
|---|---|---|
| EP | 1 262 815 | 12/2002 |
| FR | 1 179 188 | 5/1959 |
| FR | 2 389 912 | 12/1978 |

(Continued)

OTHER PUBLICATIONS

D.R. Williams et al., "Off-axis optical quality and retinal sampling in the human eye", Vision Research, vol. 36, No. 8, pp. 1103-1114, Apr. 1996.

(Continued)

*Primary Examiner* — Scott J Sugarman
(74) *Attorney, Agent, or Firm* — Cozen O'Connor

(57) ABSTRACT

A progressive ophthalmic lens for the correction of myopia, that comprises an upper area in which the correction is adapted for peripheral vision of the wearer. Such a lens reduces the risk of long term worsening of myopia for the lens wearer by reducing the defocalisation of an image formed on the retina outside the foveolar area. Also disclosed is a method for making such a lens. According to one improvement, the correction of myopia for the peripheral vision in the upper area of the lens is further adjusted based on a tendency of the wearer to turn the eyes or the head for watching an eccentric object.

15 Claims, 3 Drawing Sheets

FIRST LENS - FOVEAL VISION

FIRST LENS - PERIPHERAL VISION

FOREIGN PATENT DOCUMENTS

| | | |
|---|---|---|
| FR | 2 418 478 | 9/1979 |
| WO | WO 97/31286 | 8/1997 |
| WO | WO 03/048841 | 6/2003 |
| WO | WO 2005/055891 | 6/2005 |
| WO | WO 2007/041796 | 4/2007 |

OTHER PUBLICATIONS

Gwiazda, Jane et al., "A Randomized Clinical Trial of Progressive Addition Lenses versus Single Lenses on the Progression of Myopia in Children", Investigative Ophthalmology & Visual Science, vol. 44, No. 4, pp. 1492-1500, Apr. 2003.

T.M. Leung, Jackson, "Progression of Myopia in Hong Kong Chinese Schoolchildren is Slowed by Wearing Progressive Lenses", Optometry and Vision Science, vol. 76, No. 6, pp. 346-354, Jun. 1999.

Mutti, Donald O. et al., "Peripheral Refraction and Ocular Shape in Children", Investigative Ophthalmology & Visual Science, vol. 41, No. 5, pp. 1022-1030, Apr. 2000.

\* cited by examiner

PROGRESSIVE OPHTHALMIC LENS FOR MYOPIA CORRECTION AND METHOD FOR MAKING SUCH A LENS

RELATED APPLICATIONS

This is a U.S. national stage of application No. PCT/EP20081050958, filed on May 30, 2008.

This application claims the priority of French application no. 07/03884 filed May 31, 2007, the entire content of which is hereby incorporated by reference.

FIELD OF THE INVENTION

The present invention relates to a progressive ophthalmic lens for myopia correction and a method of making such a lens.

BACKGROUND OF THE INVENTION

It is known that the correction of the myopia of a wearer of glasses results, in the long term, in an increase in the degree of the myopia. Such an aggravation of the myopia is seen in particular in children.

It is attributed to an ophthalmic correction which is adapted for the observation of a distant object by using the central part of the retina, but which is too great for lateral parts of this object, the images of which are formed in the peripheral area of the retina. The foveal vision, or central vision, corresponds to the observation of the object with the central part of each retina, which is called the fovealar area. The lateral parts of the observed object, which are imaged by light rays entering obliquely into the eye, correspond to the peripheral vision of the wearer. Those skilled in the art then speak of overcorrection of the myopia in these peripheral vision conditions. In practice, by using the lens of glasses whose optical power is adapted for the far vision and the foveal vision, the image in far vision is formed on the retina in the foveal area, but behind the retina for the peripheral vision. Nowadays, it is considered that such a peripheral defocusing causes an elongation of the eye and, consequently, an apparent aggravation of the myopia of the wearer. The documents US 2005/0105047 and WO 2007/041796 propose modifying the optical power of ametropia-correcting unifocal lenses, so that the central area of such a lens is adapted for the foveal vision, and the peripheral area of the lens is adapted for the peripheral vision of the wearer. In this way, the aggravation of the ametropia of the wearer which is due to an inappropriate correction for the peripheral vision is reduced. Furthermore, the document WO 2007/041796 indicates that the size of the central area, which is adapted for the foveal vision, can be personalized for each wearer of lenses, according to his behavior in favoring movements of the eyes and/or the head.

Moreover, it has been observed that some children focus inaccurately when they observe an object which is situated a short distance away, that is to say, in near vision conditions. Because of this focusing defect on the part of a myopic child which is corrected for his far vision, the image of an object close by is also formed behind his retina, even in the foveal area. To avoid making a contribution to the aggravation of the myopia which is due to this focusing defect, it is known to use a myopia-correcting lens which is of the progressive lens type. Such a lens comprises a far vision area, in which the optical power of the lens is adapted to correct the myopia of the wearer when observing a distant object, a near vision area, in which the myopia correction is reduced, and an intermediate area which is situated between the far vision and near vision areas, and in which the optical power of the lens varies continually. Such progressive ophthalmic lenses are adapted for the foveal vision of the weaver.

Nevertheless, it has been observed that each of these two types of ophthalmic lenses, with an area adapted for the peripheral vision on the one hand or even progressive on the other hand, causes more residual aggravation of the ametropia of the wearer.

SUMMARY OF THE INVENTION

One object of the present invention is therefore to propose a new type of ophthalmic lens, which is adapted for a myopic wearer and which further reduces the risk of increasing the degree of his myopia in the long term.

To attain this and other objects, one aspect of the present invention is directed to a progressive ophthalmic lens which is adapted to correct a myopia of a wearer of this lens, and which comprises:
   a far vision area, in which the lens has a first optical power value adapted to produce the myopia correction for the foveal vision of the wearer, in far vision conditions;
   a near vision area, situated below the far vision area for a standard position of use of the lens by the wearer, and in which the lens has a second optical power value adapted for the foveal vision of the wearer in near vision conditions, this second value corresponding to a first reduction of the myopia correction relative to the first value; and
   an intermediate area, situated between the far vision area and the near vision area, and in which the optical power of the lens varies continually between the first and second values, the lens having a third optical power value at a reference point situated in this intermediate area and corresponding to a direction straight ahead of the gaze of the wearer for the standard position of use of the lens.

Most often, the reference point in the intermediate area of the lens, at which the third optical power value is produced, may be the mounting center of the lens which is considered for assembling the lens in a frame.

The lens is characterized in that it also has, in an upper area of the latter which is situated above the far vision area and, laterally, on each side of the reference point for the standard position of use of the lens, fourth optical power values which are adapted for the peripheral vision of the wearer when the direction of gaze of the wearer is straight ahead through the lens, and which correspond to a second reduction of the myopia correction relative to the third optical power value.

Thus, an embodiment of the invention combines, within one and same myopia-correcting ophthalmic lens, the characteristics of a progressive lens with those of a lens which is adapted to correct differently the foveal and peripheral visions of the wearer. In this way, the myopia correction which is obtained is adapted to variable observation conditions, both when the observation distance varies—far vision, intermediate vision and near vision—and when the eccentricity of parts of an object which is observed varies—foveal vision and peripheral vision. Thus, the aggravation of the myopia of the wearer caused by all these different observation conditions is avoided or reduced.

According to an embodiment of the invention, the lens is divided into at least four areas: the far and near vision areas, and the intermediate area, in which the myopia correction is more specifically adapted to the foveal vision, and the upper area in which the myopia correction is more specifically adapted to the peripheral vision for the direction of gaze straight ahead.

In the context of the invention, the expression "standard position of use of the lens" should be understood to mean the position of the latter when it is assembled in a frame, and said frame is placed on the face of the wearer with his head held vertically, or even slightly inclined forward.

The optical power variations of the lens between the far vision area and the upper area, which is dedicated to correcting the peripheral vision, are continuous, as are those that appear on each side of the reference point, between the latter and the upper area. For example, these optical power variations may result from continuous variations of a curvature and/or of a refraction index of the lens, present at the same points of the lens. In this way, the image of the observed object is formed in a continuous surface, which coincides with the retina both in the foveal area and in the peripheral area of the retina, or which does not substantially deviate from the retina into the peripheral area.

The fourth optical power values in the upper area of the lens may correspond in particular to absolute deviations which are greater than 0.5 diopters relative to the third optical power value, the latter being adapted for the foveal vision and for the direction straight ahead of the gaze of the wearer. In particular, one of the fourth optical power values, for the peripheral vision and for the direction straight ahead of the gaze of the wearer, which corresponds to an eccentricity of 30° within the upper area of the lens, may exhibit an absolute deviation which is substantially equal to 0.8 diopters relative to the third optical power value.

According to a particular embodiment of the invention, a distribution of the fourth optical power values of the lens, for the peripheral vision and for the direction straight ahead of the gaze of the wearer, is substantially constant in a rotation about the reference point, within the upper area of the lens. The peripheral vision for the direction of gaze straight ahead is then corrected uniformly in a wide angular sector.

According to another particular embodiment of the invention, the fourth optical power values, for the peripheral vision and for the direction straight ahead of the gaze of the wearer, may exhibit absolute deviations, relative to the third optical power value, which increase as a function of a distance relative to the reference point, within the upper area of the lens. Thus, the myopia correction is evenly reduced in the upper area of the lens for the peripheral vision of the wearer, from the correction value at the reference point of the lens.

Another aspect of the invention is directed to a method of making a progressive ophthalmic lens which is adapted to correct a myopia of a wearer of this lens. This method comprises the following steps:
   determining a first optical power value of the lens adapted to correct the myopia for a foveal vision of the wearer, in far vision conditions;
   determining a second optical power value of the lens adapted for the foveal vision of the wearer in near vision conditions, which second value corresponds to a first reduction of the myopia correction relative to the first value;
   producing the lens by varying at least one curvature of a face of the lens or a refraction index of a material of the lens, parallel to this face, so as to confer the first optical power value in a far vision area of the lens, and the second optical power value in a near vision area of the lens situated below the far vision area for the standard position of use of the lens by the wearer, with a continuous variation of the optical power in an intermediate area of the lens situated between the far vision area and the near vision area.

The method is characterized in that it also comprises the following steps:
   determining a third optical power value of the lens for the direction of gaze of the wearer straight ahead through the lens; and
   determining at least one fourth optical power value of the lens which is adapted for the peripheral vision of the wearer when the direction of gaze is straight ahead through the lens, and which corresponds to a second reduction of the myopia correction relative to the third optical power value.

The lens is then produced by also conferring the third optical power value at the point of the intermediate area of the lens corresponding to the direction of gaze straight ahead of the wearer, called the reference point, and the fourth optical power value at least one point of an upper area of the lens situated above the far vision area and, laterally, on each side of the reference point for the standard position of use of the lens. Furthermore, it is produced so that the optical power of the lens varies continually between the far vision area and the upper area, and between the reference point and the upper area.

In particular, a progressive ophthalmic lens as described previously can be produced by using this method.

A method according to an embodiment of the invention therefore comprises, in addition to producing the far and near vision areas of the progressive lens in accordance with a prescription drawn up for the wearer, the determination of the myopia correction which is adapted for the peripheral vision of the wearer when the latter is gazing straight ahead through the lens. The production of the lens thus combines obtaining an addition between the far and near vision areas, with the adaptation of an area of the lens more particularly for the peripheral vision. This area which is more particularly adapted for the peripheral vision and which is called upper area, is distinct from the far, near and intermediate vision areas of the lens.

According to a particular mode of implementation of a method according to the invention, some of the fourth optical power values in the upper area of the lens, for the peripheral vision and for the direction straight ahead of the gaze of the wearer, may correspond to an undercorrection of the myopia of the wearer for these observation conditions. Put another way, some of the fourth optical power values in the upper area of the lens may be determined so that the myopia of the wearer is only partially corrected for the peripheral vision and for the direction of gaze straight ahead. The lateral image parts that are formed by rays that enter obliquely into the eye are then again situated behind the retina, but with an offset behind the latter which is reduced relative to the corresponding image parts that are formed when the wearer is fitted with a standard ophthalmic lens, adapted only for the foveal vision.

According to an improvement of the invention, the method may also include the following step, which is executed before the lens is made:
   characterizing the respective relative movement amplitudes of the eyes and head of the wearer.

One of the fourth optical power values, for the peripheral vision and for the direction straight ahead of the gaze of the wearer, is then adjusted for a non-zero fixed eccentricity, for example 30°. It is adjusted so as to exhibit an absolute deviation with the third optical power value, which increases as a function of the relative amplitude of the movements of the head of the wearer, in the direction of a reduction of the myopia correction.

DETAILED DESCRIPTION OF THE DRAWINGS

FIGS. 1a, 1b, 2a and 2b are optical power maps of two progressive ophthalmic lenses for myopia. In these maps, the x and y axes are marked with angular offset values of a light ray that enters into the eye, relative to the optical axis of the lens respectively in a horizontal plane and in a vertical plane. They are marked in degrees and denoted ALPHA and BETA, ALPHA designating the offset in the vertical plane, and BETA the offset in the horizontal plane. The zero values of ALPHA and BETA correspond to the direction of gaze of the wearer straight ahead, denoted O. This direction intersects the lens at a central point of the latter, which is called reference point. A displacement in a map drawn up for the foveal vision (FIGS. 1a and 2a) corresponds to a rotation of the eye behind the lens, whereas a displacement in a map drawn up for the peripheral vision (FIGS. 1b and 2b) corresponds to a displacement in the image that is formed on the retina when the eye is immobile in the direction of gaze O. Positive values of ALPHA indicate a direction of gaze that is inclined downward for the foveal vision maps, and indicate a light ray that originates from the bottom part of the visual field for the peripheral vision maps.

In these maps, the curves represented connect points for which the optical power is constant. Given that these are myopia-correcting lenses, the optical power values are negative. A reduction of the correction therefore corresponds to a positive variation of the optical power, that is to say, to optical power values of the lens that approach zero, or that can even become positive, if necessary.

Figure 1A:
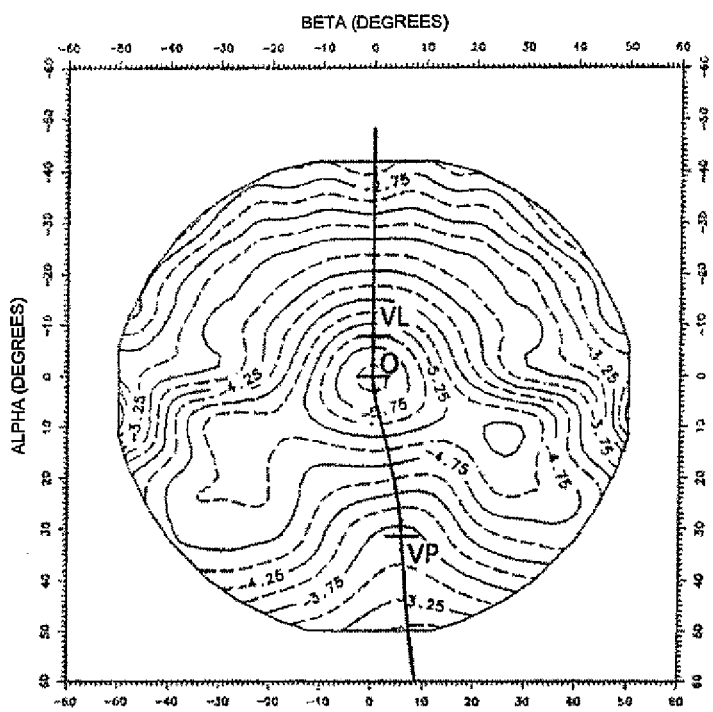
FIGS. 1a and 1b are optical power characterizations of a first ophthalmic lens made according to an embodiment of the invention, respectively for the foveal and peripheral visions of the wearer.
Figure 1B:
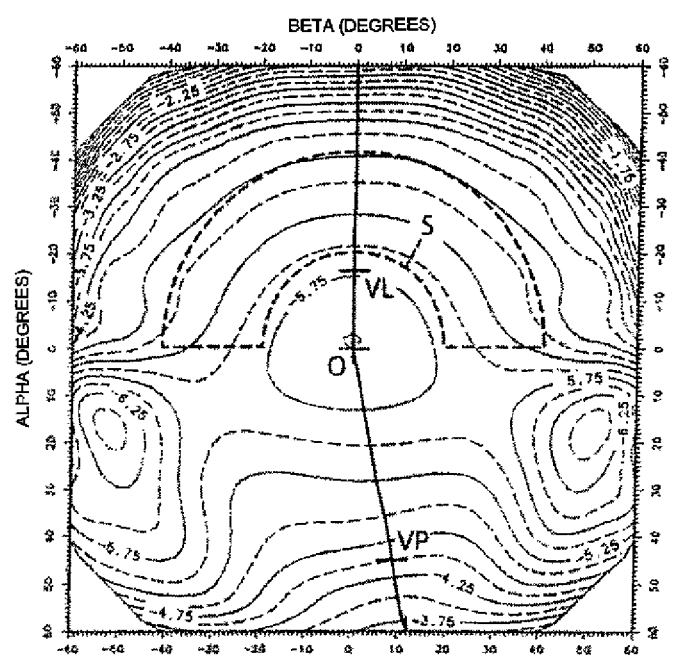

The lenses according to the invention are progressive: for the foveal vision, the optical power varies continuously between a far vision point of the lens and a near vision point. In FIG. 1a relating to foveal vision, the indications VL and VP correspond to the straight-line directions that pass through the center of rotation of the eye and, respectively, through the far and near vision points of the lens. In FIG. 1b relating to peripheral vision, the indications VL and VP correspond to the straight-line directions that pass through the center of the pupil of the eye and, respectively, through the far and near vision points of the lens.

The maps of FIGS. 1a and 1b were drawn up for a first eyeglass lens, according to the invention. This first lens corresponds to a correction of −6.0 diopters at the far vision point and to a surface addition of +2.0 diopters of the progressive face. This surface addition value corresponds to an optical addition of 2.25 diopters when worn, this latter value being the optical power deviation that appears in FIG. 1a between the direction of gaze VP and the direction VL. About the point VL, the far vision area corresponds to the points of the lens for which the optical power for the foveal vision is close to the value for the far vision point, for example with a deviation relative to this value at the far vision point which is less than 0.5 diopters as an absolute value.

The map of FIG. 1b shows that the optical power deviation for the peripheral vision relative to the value at O is greater than 0.5 diopters within an upper area of the lens, which is denoted S. In particular, this deviation increases radially in the direction of a reduction of the myopia correction. Furthermore, within the area S, the distribution of the optical power for the peripheral vision exhibits approximately a symmetry of revolution about the direction O. The upper area S which is illustrated in FIG. 1b is delimited by two arcs of circles, but it is understood that such a shape of the area adapted for the peripheral vision is given purely by way of illustration, in a simplified manner. The exact shape of the area S can in fact be adapted variably, as will become apparent hereinafter when considering the amplitudes of the movements of the head and eyes made by the wearer.

According to a first possibility, the optical power value at least one point of the area S may be determined from a measurement that is performed on the wearer of the first lens. Such a measurement may be a self-refraction or skiascopy measurement.

According to a second possibility, at least one of the optical power values in the area S may be determined for a reference eccentricity, by reducing by a fixed quantity the myopia correction that is made at the reference point of the lens, for the peripheral vision. For example, in FIG. 1b, the optical power for a light ray direction that forms an angle BETA of +/−30° with the direction O is modified by approximately 0.8 diopters relative to the optical power value for the direction O.

From the maps of FIGS. 1a and 1b, the first lens may be produced by varying at least one curvature of a face of the latter parallel to this face, in a manner that is known per se. One of the ophthalmic lens re-machining methods that are also known to those skilled in the art can then be used to confer on the face of the lens the determined curvature variations. Alternatively, or in combination with a machining of the face of the lens, a refraction index of a material of the lens may be varied, once again parallel to the face of the lens, to confer on the latter local optical power characteristics that correspond to the maps.

Figure 2A:
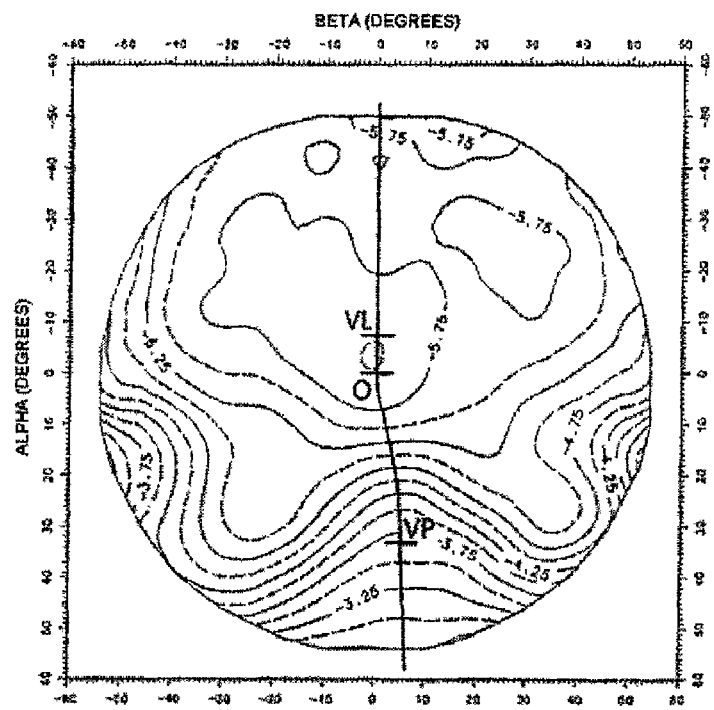
FIGS. 2a and 2b respectively correspond to FIGS. 1a and 1b, for a second ophthalmic lens taken for comparison.
Figure 2B:
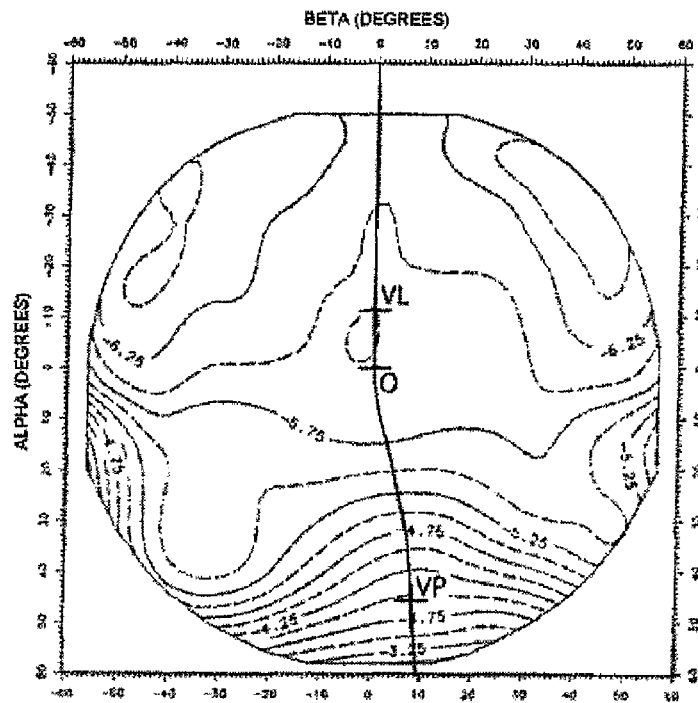

The maps of FIGS. 2a and 2b were drawn up for a second eyeglass lens, by way of comparison. This second lens also corresponds to a correction of −6.0 diopters at the far vision point and to a surface addition of +2.0 diopters of the progressive face. By comparing the maps of FIGS. 1b and 2b, it appears that the myopia correction for the peripheral vision decreases more rapidly on moving away from the central point of the image that is formed on the retina, laterally on either side of the point O and above the point VL, for the first lens and for the second lens. Given that the prescribed myopia correction is determined for the foveal vision and corresponds to an overcorrection for the peripheral vision, the first lens (FIGS. 1a and 1b) provides a better correction of the peripheral vision compared to the second lens (FIGS. 2a and 2b).

Conversely, the far vision area of the lens, which is situated about the far vision point and in which the ophthalmic correction is adapted for the foveal vision, is less extended for the first lens (FIG. 1a) than for the second lens (FIG. 2a).

Lenses that have optical power distributions that are intermediate between those of the first and second lenses described hereinabove may likewise be made. There is thus a trade-off, for myopia corrections that are identical at the far and near vision points of the lenses, between an adaptation of the corrections more for the foveal vision or more for the peripheral vision. According to an improvement of the invention, this trade-off may be adapted to the wearer of the lens, according to his propensity to use rather his foveal vision or rather his peripheral vision. Such a personalization of a lens according to the invention then additionally provides the wearer with greater visual comfort.

This improvement of the invention involves taking into account a behavioral characteristic of the wearer to favor the correction of the foveal vision or that of the peripheral vision. This behavioral characteristic is the propensity of the wearer to favor turning the head or the eyes when observing an object that is not situated in front of him.

For a wearer who favors moving the eyes to observe an off-center object, a greater area of the lens that corrects the foveal vision of the wearer is preferred. The image of an object that is observed by the wearer is then correctly formed on the retina, for a greater range of rotation angle of the eyes.

Conversely, a wearer who favors moving the head most often gazes through the lens in a restricted area that is situated about its center, the latter being associated with the direction of gaze O. It is then preferable for the upper area of the lens, in which the peripheral vision is more specifically corrected, to be larger. This increase in the upper area appears in particular on each side of the center of the lens, toward the latter in an almost horizontal direction.

Thus, an optimal trade-off between the myopia correction for the peripheral vision and that for the foveal vision, over the entire surface of the ophthalmic lens, can be obtained. This trade-off varies according to the wearer. It may be adapted to obtain good foveal vision comfort for a wearer who mainly moves his eyes, while nevertheless providing him with a correction adjusted to his peripheral vision for very inclined light rays. Conversely, a better myopia correction for the peripheral vision can be provided for a wearer who mainly moves the head. In this way, non-aggravation of the myopia of the wearer and correction comfort are combined optimally for each wearer.

Figure 3A:
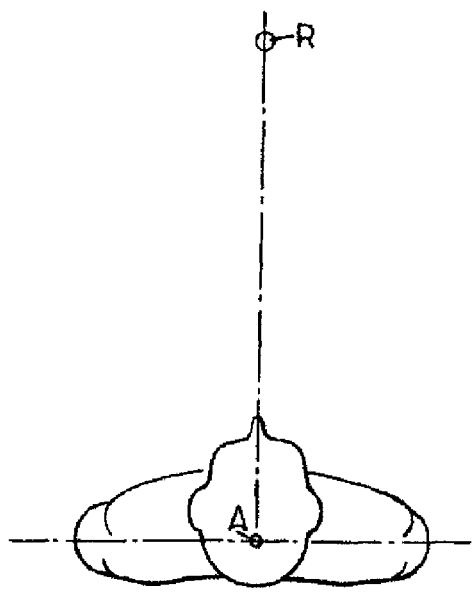
FIGS. 3a and 3b illustrate a principle of measurement of movements of the eyes and head for a wearer of glasses.

Before producing a lens according to the invention, the relative amplitudes of the movements of the eyes and head for the future wearer for which the lens is intended are first of all characterized. For this purpose, the wearer is asked to gaze straight ahead of him at a first target, called reference target, when positioned facing the latter. The reference target is denoted R in FIG. 3a. It is situated preferably at eye height for the wearer. The wearer is therefore placed in front of the reference target, with the shoulders roughly situated in a vertical plane that is perpendicular to the virtual line that links his head to the reference target. He then has his head and eyes oriented toward the reference target.

From this situation, the wearer is then asked to look at a second target, called test target and denoted T, which is offset relative to the reference target, without moving the shoulders. To do this, he turns partly the head and partly the eyes (FIG. 3b), so that the direction of his gaze passes from the reference target R to the test target T. Preferably, the test target is offset horizontally relative to the reference target, so as to characterize the horizontal movements of the head and eyes of the wearer.

Figure 3B:
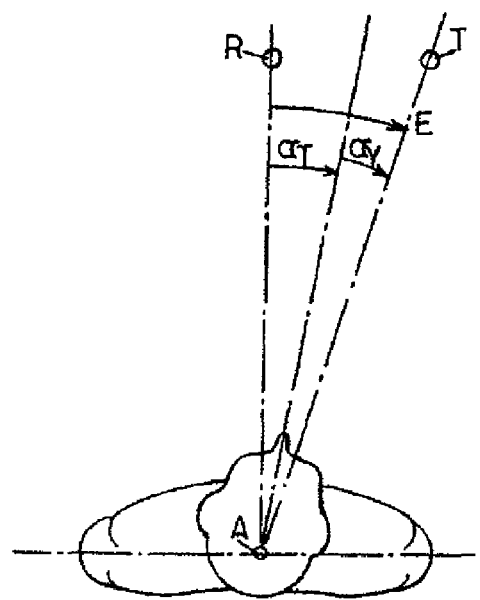

The angular offset of the test target relative to the reference target is called eccentricity, and denoted E. The center A of the head is taken as the pole of measurement of the angles in a horizontal plane that contains this pole and the two targets R and T. In FIG. 3b, $\alpha_T$ designates the angle of rotation of the head of the wearer, also called angular deviation of the head, to move from the first situation of observing the reference target to the second situation of observing the test target. $\alpha_Y$ is the angle of rotation of the eyes which is performed simultaneously by the wearer. The eccentricity E is therefore equal to the sum of the two angles $\alpha_T$ and $\alpha_Y$.

The quotient of the angular deviation of the head $\alpha_T$ by the eccentricity E is then calculated. This quotient is equal to unity for a wearer who has exclusively turned his head to switch from the reference target R to the test target T, and to zero for a wearer who has turned only his eyes.

A gain G is then calculated for this "eye/head" movement coordination test performed for the wearer. The gain G may be defined by a predetermined increasing function of the quotient of the angular deviation of the head $\alpha_T$ by the eccentricity E. For example, the gain G may be directly equal to the quotient of $\alpha_T$ by E: $G=\alpha_T/E$. A wearer who mainly turns his eyes to fix the test target therefore has a gain G value close to zero, and a wearer who mainly turns his head to fix the same target has a value of G close to unity.

This "eye/head" movement coordination test may be performed by the wearer in the shop of an optician from whom he orders his pair of glasses fitted with the corrective lens.

The optical power value of the lens for the peripheral vision, at a point of the upper area S which corresponds to an eccentricity of 30°, is then adjusted according to the value obtained for the gain G. This adjustment may consist in varying the optical power deviation relative to the point of the lens that corresponds to the direction O, or relative to a value that is deduced from a measurement performed on the wearer. The absolute optical power deviation between the point of the upper area S that corresponds to the eccentricity of 30° and the point of the lens that corresponds to the direction O is preferably reduced for an amplitude of the movements of the eyes of the wearer that is great, that is to say, a value of the coefficient G close to 0. Conversely, it is increased for an amplitude of the movements of the eyes of the wearer that is small, that is to say, a value of the coefficient G close to 1. In other words, one of the fourth optical power values that is produced for a non-zero fixed eccentricity, for example 30°, corresponds to a reduction of the myopia correction relative to the third optical power value which is produced at the reference point, this reduction being an increase in function of the value of the coefficient G.

The limit of the upper area S toward the reference point, at least on either side of this point, is then displaced according to the relative amplitude of the head movements of the wearer. The length of this displacement increases as a function of the relative amplitude of the head movements of the wearer. The upper area of the lens, which is adapted to correct the myopia of the wearer in a manner more adapted to the peripheral vision, increases toward the reference point for a wearer who favors turning his head over his eyes. The size of the far vision area of the lens can vary simultaneously, laterally toward each side of the lens and, possibly, toward the top of the lens for the standard position of use of the latter. It then decreases when the relative amplitude of the head movements of the wearer increases.

The invention claimed is:

1. A progressive ophthalmic lens adapted to provide a correction for a myopia of a wearer of said lens, the lens comprising:

a far vision area, in which the lens has a first optical power value adapted to produce the myopia correction for a foveal vision of the wearer, in far vision conditions;

a near vision area, situated below the far vision area for a standard position of use of the lens by the wearer, and in which the lens has a second optical power value adapted for the foveal vision of the wearer in near vision conditions, said second value corresponding to a first reduction of the myopia correction relative to said first value; and an intermediate area, situated between the far vision area and the near vision area, and in which the optical power of the lens varies continually between said first and second values, the lens having a third optical power value at a reference point situated in said intermediate area and corresponding to a direction straight ahead of the gaze of the wearer for the standard position of use of the lens, wherein the lens has, in an upper area of said lens situated above the far vision area and, laterally, on each side of the reference point for the standard position of use of the lens, fourth optical power values which are adapted for a peripheral vision of the wearer when the direction of the gaze of said wearer is straight ahead through the lens, and which correspond to a second reduction of the myopia correction relative to said third optical power value, the optical power of the lens varying continually between the far vision area and the upper area, and between the reference point and the upper area.

2. The lens as claimed in claim 1, wherein some of the fourth optical power values in the upper area of the lens, for the peripheral vision and for the direction straight ahead of the gaze of the wearer, correspond to absolute deviations greater than 0.5 diopters relative to said third optical power value.

3. The lens as claimed in claim 1, wherein one of the fourth optical power values, for the peripheral vision and for the direction straight ahead of the gaze of the wearer, corresponding to an eccentricity of 30° within the upper area of the lens, exhibits an absolute deviation substantially equal to 0.8 diopters relative to said third optical power value.

4. The lens as claimed in claim 1, wherein a distribution of the fourth optical power values, for the peripheral vision and for the direction straight ahead of the gaze of the wearer, is substantially constant in a rotation about the reference point, within the upper area of the lens.

5. The lens as claimed in claim 1, wherein the fourth optical power values, for the peripheral vision and for the direction straight ahead of the gaze of the wearer, exhibit absolute deviations, relative to said third optical power value, which increase as a function of a distance relative to the reference point, within the upper area of the lens.

6. A method of making a progressive ophthalmic lens adapted to correct a myopia of a wearer of said lens, comprising the steps of:
determining a first optical power value of the lens adapted to correct the myopia for a foveal vision of the wearer, in far vision conditions;
determining a second optical power value of the lens adapted for the foveal vision of the wearer in near vision conditions, said second value corresponding to a first reduction of the myopia correction relative to said first value;
producing the lens by varying at least one curvature of a face of said lens or a refraction index of a material of said lens, parallel to said face, so as to confer said first optical power value in a far vision area of the lens, and said second optical power value in a near vision area of the lens situated below the far vision area for a standard position of use of the lens by the wearer, with a continuous variation of the optical power in an intermediate area of the lens situated between the far vision area and the near vision area;
determining a third optical power value of the lens for a direction of gaze of the wearer straight ahead through the lens; and
determining at least one fourth optical power value of the lens which is adapted for a peripheral vision of the wearer when the direction of gaze of said wearer is straight ahead through the lens, and which corresponds to a second reduction of the myopia correction relative to said third optical power value, and wherein the lens is produced by also conferring said third optical power value at a reference point of the lens situated in the intermediate area of the lens and corresponding to the direction of gaze straight ahead of the wearer, and said fourth optical power value at least one point of an upper area of said lens situated above the far vision area and, laterally, on each side of the reference point for the standard position of use of the lens, the optical power of the lens varying continually between the far vision area and the upper area, and between the reference point and the upper area.

7. The method as claimed in claim 6, wherein the fourth optical power value is determined from a measurement of the peripheral vision taken on the wearer.

8. The method as claimed in claim 7, wherein the measurement of the peripheral vision taken on the wearer is a measurement of self-refraction or skiascopy.

9. The method as claimed in claim 6, wherein the fourth optical power value is determined for an eccentricity of 30° by modifying by approximately 0.8 diopters said third optical power value in the direction of a reduction of the myopia correction.

10. The method as claimed in claim 6, wherein some of the fourth optical power values in the upper area of the lens correspond to an undercorrection of the myopia for the peripheral vision and for the direction straight ahead of the gaze of the wearer.

11. The method as claimed in claim 6, wherein the lens is also produced so that a distribution of optical power values, for the peripheral vision and for the direction straight ahead of the gaze of the wearer, is substantially constant during rotation about the reference point, within the upper area of the lens.

12. The method as claimed in claim 6, wherein the lens is also produced so that optical power values for the peripheral vision and for the direction straight ahead of the gaze of the wearer, exhibit absolute deviations, relative to said third optical power value, which increase as a function of a distance relative to the reference point, within the upper area of the lens.

13. The method as claimed in claim 6, also comprising the following step, executed before the lens is made:
characterizing respective relative movement amplitudes of the eyes and the head of the wearer,
and wherein one of the fourth optical power values, for the peripheral vision and for the direction straight ahead of the gaze of the wearer, corresponding to a non-zero fixed eccentricity, is adjusted to exhibit an absolute deviation with said third optical power value, which increases as a function of the relative amplitude of the movements of the head of the wearer in the direction of a reduction of the myopia correction.

14. The method as claimed in claim 13, wherein a limit of the upper area toward the reference point of the lens, at least laterally on each side of said reference point for the standard position of use of the lens, is displaced by a length toward said reference point which increases as a function of the relative amplitude of the movements of the head of the wearer.

15. The method as claimed in claim 13, wherein the characterization of the respective relative movement amplitudes of the eyes and head of the wearer comprises a gain calculation for an "eye/head" movement coordination test carried out for the wearer, said gain being an increasing function of a quotient of an angular deviation of the head of the wearer divided by an angular eccentricity of a target observed by said wearer.

* * * * *